United States Patent
Elliot et al.

(10) Patent No.: US 11,086,640 B2
(45) Date of Patent: Aug. 10, 2021

(54) COMPOSITE GRAPHICAL INTERFACE WITH SHAREABLE DATA-OBJECTS

(71) Applicant: Palantir Technologies Inc., Palo Alto, CA (US)

(72) Inventors: Mark Elliot, London (GB); Brian Schimpf, Vienna, VA (US); Timothy Slatcher, London (GB); Ashwin Ramaswamy, New York, NY (US)

(73) Assignee: Palantir Technologies Inc., Palo Alto, CA (US)

( * ) Notice: Subject to any disclaimer, the term of this patent is extended or adjusted under 35 U.S.C. 154(b) by 0 days.

(21) Appl. No.: 16/444,286

(22) Filed: Jun. 18, 2019

(65) Prior Publication Data

US 2019/0303180 A1    Oct. 3, 2019

Related U.S. Application Data

(63) Continuation of application No. 15/423,380, filed on Feb. 2, 2017, now Pat. No. 10,437,612, which is a
(Continued)

(51) Int. Cl.
*G06F 3/0481* (2013.01)
*G06F 9/451* (2018.01)
*G06F 3/0482* (2013.01)

(52) U.S. Cl.
CPC ............ *G06F 9/451* (2018.02); *G06F 3/0482* (2013.01); *G06F 3/04817* (2013.01)

(58) Field of Classification Search
CPC .................................................. G06F 3/0482
(Continued)

(56) References Cited

U.S. PATENT DOCUMENTS 7,216,088 B1 *   5/2007   Chappel ......... G06Q 10/063118
                                                    705/7.17
7,512,965 B1     3/2009   Amdur et al.
(Continued)

FOREIGN PATENT DOCUMENTS

EP    3188006 A1    7/2017
EP    3188069 B1    3/2020

OTHER PUBLICATIONS

U.S. Appl. No. 15/139,793 U.S. Pat. No. 9,612,723, filed Apr. 27, 2016, Composite Graphical Interface With Shareable Data-Objects.
(Continued)

*Primary Examiner* — Reza Nabi
(74) *Attorney, Agent, or Firm* — Schwegman Lundberg & Woessner, P.A.

(57) ABSTRACT

Aspects of the present disclosure involve receiving references to application data of applications hosted by the servers. The application data includes information defining an interface of the application (e.g., a set of interface elements), and data types associated with the application. As a part of the process for generating a composite graphical user interface (GUI), the composite interface system receives references to application data of one or more applications at various memory locations (e.g., at both local and third-party servers). In this way, the composite interface system accesses the application data of any referenced application in order to retrieve application data to configure a composite GUI which includes interface elements of each of the referenced application.

20 Claims, 9 Drawing Sheets

Related U.S. Application Data continuation of application No. 15/139,793, filed on Apr. 27, 2016, now Pat. No. 9,612,723.

(60) Provisional application No. 62/273,320, filed on Dec. 30, 2015.

(58) Field of Classification Search
USPC .......................................................... 715/762
See application file for complete search history.

(56) References Cited

U.S. PATENT DOCUMENTS

| | | | | |
|---|---|---|---|---|
| 9,612,723 | B1 | 4/2017 | Elliot et al. | |
| 2004/0205656 | A1* | 10/2004 | Reulein | G06F 40/154 715/255 |
| 2005/0114361 | A1 | 5/2005 | Roberts et al. | |
| 2005/0289109 | A1* | 12/2005 | Arrouye | G06F 16/14 |
| 2007/0047439 | A1* | 3/2007 | An | G06Q 10/10 370/231 |
| 2007/0083541 | A1* | 4/2007 | Fraleigh | G06F 40/177 |
| 2007/0094256 | A1* | 4/2007 | Hite | G06F 16/36 |
| 2007/0174760 | A1* | 7/2007 | Chamberlain | G06F 40/103 715/220 |
| 2008/0033919 | A1* | 2/2008 | Arrouye | G06F 16/907 |
| 2008/0091808 | A1* | 4/2008 | Mei | H04L 67/025 709/223 |
| 2008/0307343 | A1* | 12/2008 | Robert | G06F 3/0482 715/765 |
| 2008/0313175 | A1* | 12/2008 | Kersten | G06Q 10/06 |
| 2009/0007088 | A1* | 1/2009 | Fischer | G06F 8/60 717/165 |
| 2009/0088964 | A1* | 4/2009 | Schaaf | G06F 3/04842 701/532 |
| 2009/0119309 | A1* | 5/2009 | Gibson | G06F 16/283 |
| 2009/0119638 | A1* | 5/2009 | Li | G06F 8/20 717/101 |
| 2009/0125359 | A1* | 5/2009 | Knapic | G06Q 10/06 705/7.23 |
| 2009/0125369 | A1* | 5/2009 | Kloostra | G06Q 10/00 705/35 |
| 2009/0125459 | A1* | 5/2009 | Norton | G06N 5/025 706/10 |
| 2009/0132921 | A1* | 5/2009 | Hwangbo | G06F 16/64 715/716 |
| 2009/0132953 | A1* | 5/2009 | Reed, Jr. | G06F 3/0481 715/781 |
| 2009/0143052 | A1* | 6/2009 | Bates | H04M 3/4931 455/414.2 |
| 2009/0144262 | A1* | 6/2009 | White | G06F 16/242 |
| 2009/0164934 | A1* | 6/2009 | Bhattiprolu | G06F 3/0483 715/777 |
| 2009/0171939 | A1* | 7/2009 | Athsani | G06F 16/29 |
| 2009/0172511 | A1* | 7/2009 | Decherd | G06F 16/9537 715/207 |
| 2009/0172821 | A1* | 7/2009 | Daira | G06F 21/55 726/27 |
| 2009/0177962 | A1* | 7/2009 | Gusmorino | G06F 16/168 715/243 |
| 2009/0179892 | A1* | 7/2009 | Tsuda | G06F 3/0485 345/419 |
| 2009/0187464 | A1* | 7/2009 | Bai | G06Q 10/04 705/7.34 |
| 2009/0222400 | A1* | 9/2009 | Kupershmidt | G16B 30/00 706/52 |
| 2009/0222759 | A1* | 9/2009 | Drieschner | G06F 16/951 715/780 |
| 2009/0222760 | A1* | 9/2009 | Halverson | G06F 40/177 715/781 |
| 2009/0234720 | A1* | 9/2009 | George | G06Q 10/06 705/7.42 |
| 2009/0254970 | A1* | 10/2009 | Agarwal | H04L 63/1425 726/1 |
| 2009/0281839 | A1* | 11/2009 | Lynn | G16H 30/40 705/3 |
| 2009/0287470 | A1* | 11/2009 | Farnsworth | G06F 40/20 704/3 |
| 2009/0292626 | A1* | 11/2009 | Oxford | G06Q 30/0601 705/26.1 |
| 2010/0011282 | A1* | 1/2010 | Dollard | G06F 40/169 715/233 |
| 2010/0042922 | A1* | 2/2010 | Bradateanu | G06F 16/2428 715/711 |
| 2010/0057716 | A1* | 3/2010 | Stefik | G06F 16/355 707/E17.108 |
| 2010/0070523 | A1* | 3/2010 | Delgo | G11B 27/34 707/769 |
| 2010/0070845 | A1* | 3/2010 | Facemire | G06Q 10/10 715/230 |
| 2010/0070897 | A1* | 3/2010 | Aymeloglu | G06F 3/0482 715/765 |
| 2010/0100963 | A1* | 4/2010 | Mahaffey | G06F 21/564 726/25 |
| 2010/0103124 | A1* | 4/2010 | Kruzeniski | G06F 3/04883 345/173 |
| 2010/0114887 | A1* | 5/2010 | Conway | G06F 16/374 707/737 |
| 2010/0131457 | A1* | 5/2010 | Heimendinger | G06F 16/283 707/602 |
| 2010/0191563 | A1* | 7/2010 | Schlaifer | G16H 40/20 705/7.36 |
| 2010/0198684 | A1* | 8/2010 | Eraker | G06Q 30/0251 705/14.49 |
| 2010/0228812 | A1* | 9/2010 | Uomini | H04L 51/12 709/203 |
| 2010/0250412 | A1* | 9/2010 | Wagner | G06F 16/2477 705/31 |
| 2010/0280857 | A1* | 11/2010 | Liu | G06Q 10/087 707/600 |
| 2010/0293174 | A1* | 11/2010 | Bennett | G06F 16/353 707/759 |
| 2010/0306713 | A1* | 12/2010 | Geisner | G06F 3/04847 715/863 |
| 2010/0313119 | A1* | 12/2010 | Baldwin | G06F 40/143 715/256 |
| 2010/0318924 | A1* | 12/2010 | Frankel | G06Q 10/06 715/752 |
| 2010/0321399 | A1* | 12/2010 | Ellren | G06F 16/29 345/587 |
| 2010/0325526 | A1* | 12/2010 | Ellis | G06F 3/04847 715/217 |
| 2010/0325581 | A1* | 12/2010 | Finkelstein | G06F 16/00 715/810 |
| 2011/0029526 | A1* | 2/2011 | Knight | G06F 16/287 707/737 |
| 2011/0047159 | A1* | 2/2011 | Baid | G06F 16/355 707/738 |
| 2011/0060753 | A1* | 3/2011 | Shaked | G06F 16/285 707/769 |
| 2011/0061013 | A1* | 3/2011 | Bilicki | G06Q 10/06393 715/771 |
| 2011/0066933 | A1* | 3/2011 | Ludwig | G06F 40/103 715/212 |
| 2011/0074811 | A1* | 3/2011 | Hanson | G06T 11/00 345/629 |
| 2011/0078055 | A1* | 3/2011 | Faribault | G06Q 30/02 705/27.2 |
| 2011/0078173 | A1* | 3/2011 | Seligmann | G06Q 10/10 707/769 |
| 2011/0093327 | A1* | 4/2011 | Fordyce, III | G06Q 30/0224 705/14.39 |
| 2011/0117878 | A1* | 5/2011 | Barash | G08B 25/005 455/404.2 |
| 2011/0119100 | A1* | 5/2011 | Ruhl | G06Q 10/06 705/7.11 |
| 2011/0137766 | A1* | 6/2011 | Rasmussen | G06F 16/9537 705/30 |
| 2011/0153384 | A1* | 6/2011 | Horne | G06Q 40/06 705/7.29 |

(56) References Cited

U.S. PATENT DOCUMENTS

| | | | |
|---|---|---|---|
| 2011/0161096 A1* | 6/2011 | Buehler | G06F 3/0482 705/2 |
| 2011/0167105 A1* | 7/2011 | Ramakrishnan | G06Q 10/10 709/203 |
| 2011/0170799 A1* | 7/2011 | Carrino | G09B 29/007 382/285 |
| 2011/0173032 A1* | 7/2011 | Payne | G06Q 10/02 705/5 |
| 2011/0185316 A1* | 7/2011 | Reid | G06F 3/04883 715/863 |
| 2011/0208724 A1* | 8/2011 | Jones | G06F 16/288 707/723 |
| 2011/0213655 A1* | 9/2011 | Henkin | G06Q 30/0251 705/14.49 |
| 2011/0218934 A1* | 9/2011 | Elser | G06Q 50/16 705/36 R |
| 2011/0219450 A1* | 9/2011 | McDougal | H04L 63/1416 726/23 |
| 2011/0225198 A1* | 9/2011 | Edwards | G06Q 50/26 707/780 |
| 2011/0238495 A1* | 9/2011 | Kang | G06Q 30/02 705/14.49 |
| 2011/0238553 A1* | 9/2011 | Raj | G06Q 20/405 705/37 |
| 2011/0251951 A1* | 10/2011 | Kolkowitz | G06Q 20/40 705/39 |
| 2011/0258158 A1* | 10/2011 | Resende, Jr. | G06F 16/24532 707/608 |
| 2011/0270705 A1* | 11/2011 | Parker | G06F 16/29 705/26.61 |
| 2011/0289397 A1* | 11/2011 | Eastmond | G06Q 10/10 715/212 |
| 2011/0289420 A1* | 11/2011 | Morioka | G06Q 30/06 715/738 |
| 2011/0291851 A1* | 12/2011 | Whisenant | H04M 11/04 340/686.1 |
| 2011/0310005 A1* | 12/2011 | Chen | G06F 3/017 345/156 |
| 2011/0314007 A1* | 12/2011 | Dassa | G06F 16/22 707/723 |
| 2012/0019559 A1* | 1/2012 | Siler | G16H 50/70 345/634 |
| 2012/0036013 A1* | 2/2012 | Neuhaus | G06Q 30/02 705/14.53 |
| 2012/0036434 A1* | 2/2012 | Oberstein | G06F 3/0482 715/702 |
| 2012/0124547 A1* | 5/2012 | Halbedel | G06F 16/903 717/100 |
| 2014/0282370 A1* | 9/2014 | Schaefer | G06F 8/35 717/105 |
| 2015/0074819 A1* | 3/2015 | Borenstein | G06F 16/213 726/27 |
| 2015/0213082 A1* | 7/2015 | Frankel | G06F 16/24578 707/758 |
| 2015/0347099 A1 | 12/2015 | Breedvelt-schouten et al. | |
| 2016/0170802 A1* | 6/2016 | Belhekar | G06F 11/3433 719/320 |

OTHER PUBLICATIONS

U.S. Appl. No. 15/423,380 U.S. Pat. No. 10,437,612, filed Feb. 2, 2017, Composite Graphical Interface With Shareable Data-Objects.

"U.S. Appl. No. 15/139,793, Notice of Allowance dated Nov. 18, 2016", 25 pgs.

"U.S. Appl. No. 15/423,380, Notice of Allowance dated Jun. 3, 2019", 25 pgs.

"European Application Serial No. 16206931.4, Extended European Search Report dated May 22, 2017", 10 pgs.

"European Application Serial No. 16206931.4, Communication Pursuant to Article 94(3) EPC dated Feb. 5, 2021", 3 pgs.

"European Application Serial No. 20160363.6, Extended European Search Report dated May 14, 2020", 9 pgs.

* cited by examiner

ARTIFACT APP TITLE
720

730 — Search
⊕ Create new

| NAME | LAST UPDATED | TYPE | OWNED BY |
|---|---|---|---|
| Nuclear Attack Research | 5 minutes ago | Map | Me |
| My Awesome Slate Doc | 3 hours ago | Dashboard | Me |
| My Secret Graph Artifact | Yesterday at 1:23 PM | Graph | Eric Grossman |
| Nuclear Attack Research | Yesterday at 11:21 AM | Graph | Me |
| My Secret Map Artifact | 750 Oct 27, 2014 at 12:35 PM | Map | Me |
| My Awesome Slate Doc | Oct 26, 2014 at 12:35 PM | Dashboard | Eric Grossman |
| Nuclear Attack Research | Oct 25, 2014 at 3:35 PM | Folder | Me |
| My Secret Map Artifact | Oct 25, 2014 at 12:35 PM | Map | |
| My Secret Graph Artifact | Oct 17, 2014 at 5:21 PM | Graph | |
| Nuclear Attack Research | Oct 17, 2014 at 5:21 PM | Map | |
| My Secret Map Artifact | Oct 10, 2014 at 5:21 PM | Dashboard | |
| My Awesome Slate Doc | Oct 04, 2014 at 5:21 PM | Dashboard | |
| Nuclear Attack Research | Oct 01, 2014 at 5:21 PM | Graph | 740 |
| My Secret Map Artifact | Sep 28, 2014 at 5:21 PM | Map | |
| My Secret Graph Artifact | Sep 26, 2014 at 5:21 PM | Graph | Eric Grossman |
| My Secret Graph Artifact | Oct 17, 2014 at 5:21 PM | Graph | Eric Grossman |

640
- Share
- Duplicate
- Rename
- Edit Dashboard
- Convert
- Delete

COMPOSITE GRAPHICAL INTERFACE WITH SHAREABLE DATA-OBJECTS

RELATED APPLICATIONS

This application is a continuation of U.S. patent application Ser. No. 15/423,380, entitled "COMPOSITE GRAPHICAL INTERFACE WITH SHAREABLE DATA-OBJECTS," filed Feb. 2, 2017, which is a continuation of U.S. patent application Ser. No. 15/139,793, entitled "COMPOSITE GRAPHICAL INTERFACE WITH SHAREABLE DATA-OBJECTS," filed Apr. 27, 2016, which claims the priority benefit of U.S. Provisional Application No. 62/273,320, entitled "COMPOSITE GRAPHICAL INTERFACE WITH SHAREABLE DATA-OBJECTS," filed Dec. 30, 2015, all of which are hereby incorporated by reference in their entirety.

TECHNICAL FIELD

The subject matter disclosed herein relates to the seamless sharing of data object across multiple application platforms. In particular, example embodiments relate to a composite interface system for generating a composite graphical user interface, and facilitating the sharing of data objects across multiple platforms in a computer network environment, through the composite graphical user interface.

BACKGROUND

In an effort to create specialized and independent products, developers have developed a multitude of unique applications for computer systems, configured to perform a vast array of functions quickly and effectively. However, in pressing for this isolated application development model, some of the advantages of monolithic products and applications have been abandoned—namely, seamless user experience, and data sharing. Applications of computer systems utilize a variety of different file and data types, to perform distinct functions which are often unique to a particular application or system. Additionally, the applications themselves have corresponding user interfaces, with interface elements unique to themselves, and specially configured to facilitate access to certain data types.

As a result, user experience between applications tends to be choppy and jarring, with little to no continuity. Furthermore, data types are often incompatible between applications. These issues lead to a disconnected and problematic user experience.

BRIEF DESCRIPTION OF THE DRAWINGS

Various ones of the appended drawings merely illustrate example embodiments of the present disclosure and are not intended to limit its scope to the illustrated embodiments. On the contrary, these examples are intended to cover alternatives, modifications, and equivalents as may be included within the scope of the disclosure.

FIG. 7 is an interface diagram illustrating a composite graphical user interface displaying a set of artifacts, consistent with some embodiments.

DETAILED DESCRIPTION

Figure 1:
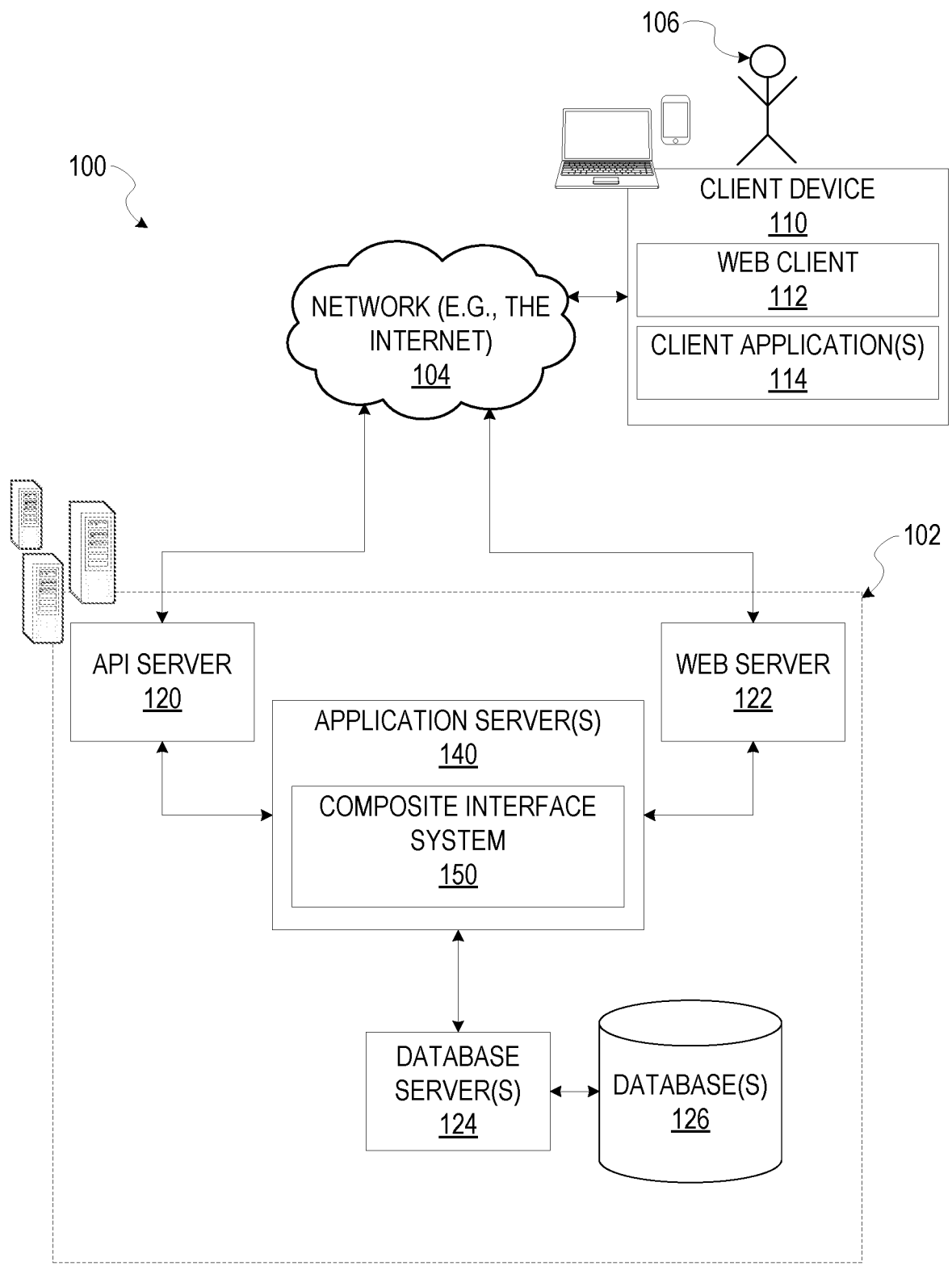
FIG. 1 is a network diagram depicting a network system comprising a group of application servers in communication with a network-based composite interface system configured for receiving references to application data and generating a composite graphical user interface, according to an example embodiment.

Reference will now be made in detail to specific example embodiments for carrying out the inventive subject matter of the present disclosure. In the following description, specific details are set forth in order to provide a thorough understanding of the subject matter. It shall be appreciated that embodiments may be practiced without some or all of these specific details.

Example embodiments relate to a network-based composite interface system, employed for generating a composite graphical user interface (GUI) based on interface elements of referenced applications, to facilitate the sharing of data objects across those applications. A "data object" as used herein may include any item of data or code that can be used by one or more computer programs to execute operations. "Application data" refers to data associated with an application, including, for example, configuration files to configure the parameters and initial settings of applications, as well as application program interfaces (API) associated with the applications. In example embodiments, the data is stored in one or more network databases and are capable of being accessed by applications hosted by servers that share common access to the network database, through the composite graphical user interface. Additional details regarding data objects can be found in U.S. Provisional Application No. 62/272,003 entitled "NETWORK-BASED PERMISSIONING SYSTEM," assigned to the assignee of the instant application, which application is hereby incorporated by reference in its entirety.

Aspects of the present disclosure involve receiving references to application data of applications hosted by the servers. As briefly stated above, the application data includes the set of routines, protocols, and tools for building an application, and the interface of the application. Additionally, the application data may also refer to specific data types associated with the application. Thus, the application data is essentially a description for a computer of how to build a particular application (including its functionality). As a part of the process for generating a composite GUI, the composite interface system receives references to application data of one or more applications at various memory locations (e.g., at both local and third-party servers, as well as cloud servers). In this way, the composite interface system may access the application data of any referenced application in order to configure a composite GUI which includes interface elements of the referenced application (e.g., interface elements and locations of the interface elements within a GUI).

Accordingly, having received the references to the application data, the composite interface system generates and presents a composite GUI at a client device. The composite GUI includes the interface elements of the referenced application, and thereby facilitates the execution of functions and operations performed by the application, without the client device necessarily having direct access or compatibility to the functions of the application itself. In some embodiments, the composite interface system is configured to cause one or more processors of the client device to generate the composite interface.

A portion of the composite GUI generated by the composite interface system includes a sidebar configured to display a graphical element (or elements) representative of the referenced applications. The composite GUI may receive inputs from a client device through the sidebar (e.g., a selection of a graphical element), to launch and cause display of interface elements associated with referenced applications.

Once the composite GUI has been generated and displayed at the client device, the composite interface system receives a selection of a data object from the client device. The data object may be located at a third party server, a local database, or at the client device itself. Having received a selection of the data object, the composite interface system identifies an object type of the data object in order to determine a compatible application to access. After determining the compatible application, the composite interface system access the application data of the compatible application to retrieve the information defining the interface of the application, and causes display of the interface elements of the application within the composite GUI. Thus, a user of the client device may have access to interfaces and functionality of multiple applications through a single composite GUI.

In some embodiments, in order to facilitate sharing of data objects between applications, the composite interface system employs a method of creating and storing artifacts which reference individual data objects of the application (or applications) referenced to the composite GUI. Artifacts are structured and accessed depending on what the base application specifies. An artifact is a reference to a particular data object (or instance of a data object). For example, the referenced application has a data object associated with it, and the data object itself has a number of data attributes surrounding it. The data attributes include, for example, user permissions, a data type identifier, a search instance identifier, a source identifier, and a specific ID of the data object itself.

Having received a selection of a particular data object, the composite interface system creates an artifact referencing the data object. The artifact includes metadata associated with the data object, and formatted by the composite interface system. For example, the composite interface system may include an artifact repository for the discovery, organization, and collection of artifacts, to enable collaborative project development by facilitating the creation and sharing of projects comprising one or more artifacts.

In some example embodiments, the composite interface system provides a publish-subscribe type messaging service, where users may define projects within the composite graphical user interface by selecting one or more artifacts to include in a project, and automatically distribute the project to groups of subscribers. For example, a user of the client device may search the set of artifacts displayed at the client device via a search field within the composite GUI. The composite interface system may then remove at least a portion of artifacts from the set of artifacts based on the search, leaving a presentation of only relevant artifacts. The user may then select one or more artifacts from among the remaining artifacts to assign to a project. Having defined a project, the user may then distribute the project to a subscriber or group of subscribers.

FIG. 1 is a network diagram illustrating a network environment 100 suitable for operating a composite interface system 150. A networked system 102 provides server-side functionality, via a network 104 (e.g., an intranet, the Internet or a Wide Area Network (WAN)), to one or more clients such as the client device 110. FIG. 1 illustrates a web client 112, client applications 114 executing on respective client device 110.

An Application Program Interface (API) server 120 and a web server 122 are coupled to, and provide programmatic and web interfaces respectively to, one or more application servers 140. The application servers 140 host the composite interface system 150. The application servers 140 are, in turn, shown to be coupled to one or more database servers 124 that facilitate access to one or more databases 126.

A composite interface system 150 facilitates the creation of composite GUI and sharable artifacts for the networked system 102. For example, the composite interface system 150 is configured to receive references to application data from a client device 110, and generate a composite GUI based on the referenced application data.

As shown, the network environment 100 includes the client device 110 in communication with the networked system 102 over the network 104. The networked system 102 communicates and exchanges data with the client device 110 that pertains to various functions and aspects associated with the networked system 102 and its users. Likewise, the client device 110, which may be any of a variety of types of devices that include at least a display, a processor, and communication capabilities that provide access to the network 104 (e.g., a smart phone, a tablet computer, a personal digital assistant (PDA), a personal navigation device (PND), a handheld computer, a desktop computer, a laptop or netbook, or a wearable computing device), may be operated by a user (e.g., a person) of the network system 100 to exchange data with the presentation platform 104 over the network 106.

The client device 110 communicates with the network 104 via a wired or wireless connection. For example, one or more portions of the network 104 may comprises an ad hoc network, an intranet, an extranet, a Virtual Private Network (VPN), a Local Area Network (LAN), a wireless LAN (WLAN), a Wide Area Network (WAN), a wireless WAN (WWAN), a Metropolitan Area Network (MAN), a portion of the Internet, a portion of the Public Switched Telephone Network (PSTN), a cellular telephone network, a wireless network, a Wireless Fidelity (Wi-Fi®) network, a Worldwide Interoperability for Microwave Access (WiMax) network, another type of network, or any suitable combination thereof.

In various embodiments, the data exchanged between the client device 110 and the networked system 102 may involve user-selected functions available through one or more user interfaces (UIs). The UIs may be specifically associated with a web client 112 (e.g., a browser) or an application 114, executing on the client device 110, and in communication with the presentation platform 102.

Turning specifically to the networked system 102, a web server 122 is coupled to (e.g., via wired or wireless interfaces), and provides web interfaces to, an application server 140. In some embodiments, the composite interface system 150 runs and executes on the application server 140, while in other embodiments, the application server 140 provides the client device 110 with a set of instructions (e.g., computer-readable code) that causes the web client 112 and the client application 114 of the client device 110 to execute and run the composite interface system 150.

Figure 2:
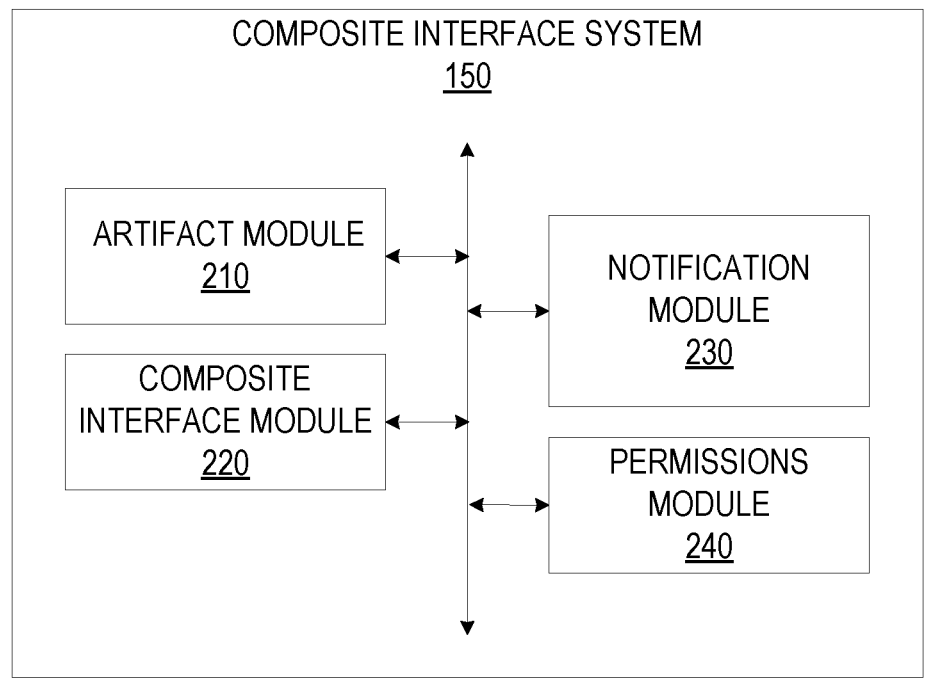
FIG. 2 is a block diagram illustrating various components of the composite interface system, which is provided as part of the network system, consistent with some embodiments.

FIG. 2 is a block diagram illustrating various components of the composite interface system 150, which is provided as part of the network system 102, consistent with some embodiments. To avoid obscuring the inventive subject matter with unnecessary detail, various functional components (e.g., modules and engines) that are not germane to conveying an understanding of the inventive subject matter have been omitted from FIG. 2. However, a skilled artisan will readily recognize that various additional functional components may be supported by the composite interface system 150 to facilitate additional functionality that is not specifically described herein.

As is understood by skilled artisans in the relevant computer arts, each functional component (e.g., module) illustrated in FIG. 2 may be implemented using hardware (e.g., a processor of a machine) or a combination of logic (e.g., executable software instructions) and hardware (e.g., memory and processor of a machine) for executing the logic. Furthermore, one or more of the various functional components depicted in FIG. 2 may reside on a single computer (e.g., a laptop, client device 110), or may be distributed across several computers in various arrangements such as cloud-based architectures. In some embodiments, modules of the composite interface system 150 may be distributed between the client device 110 and application server 140. Moreover, it shall be appreciated that while the functional components (e.g., modules) of FIG. 2 are discussed in the singular sense, in other embodiments, multiple instances of one or more of the modules may be employed.

The composite interface system 150 is shown as including an artifact module 210, a composite interface module 220, a notification module 230, and a permissions module 240, all configured to communicate with each other (e.g., via a bus, shared memory, a switch, or application programming interfaces (APIs)).

The artifact module 210 facilitates discovery, organization and collection of artifacts and to enable collaborative project development. The artifact module 210 creates artifacts based on metadata of identified data objects (e.g., by the artifact module 210 itself, or via user selection). An artifact is a reference to a data object, crated based on metadata associated with the data object. For example, a data object may have metadata which includes data defining a source of the data object, user permissions of the data object, a unique identifier of the data object, a data type of the data object, and so on. Upon identifying the data object, the artifact module 210 creates an artifact for the data object with the metadata. Having created an artifact, the artifact module 210 may store the artifact within an artifact repository, along with a set of artifacts.

In some embodiments, the artifact module 210 facilitates the creation, editing, and exporting of projects. In the context of this specification, a project is a sharable object comprising one or more artifacts. For example, the artifact module 210 may receive a selection of one or more artifacts through a composite GUI presented at a client device, and assign the selection of artifacts to a project. The artifact module 210 may additionally assign a project identifier (e.g., project ID) to the project.

The composite interface module 220 receives references to application data, extracts interface data defining interface elements from the application data, and generates a composite GUI based on the application data. The application data may include an identifier of the application, a network address of the application, and interface data defining an interface of the application. The composite interface module 220 may reside server side (e.g., within the application server 140), or in some embodiments may reside client side (e.g., within the client device 110), such that the generation of the composite GUI is accomplished by one or more processors of the client device 110.

In some example embodiments, the composite interface module 220 receives a set of references to multiple sets of application data, and in response to receiving an instruction to generate a composite GUI, generates a composite GUI based on the referenced application data. The composite GUI includes a presentation of interface elements from each of the applications associated with the set of application data received. For example, in response to receiving a reference to application data, the composite interface module 220 may generate and cause display of a graphical icon representative of the application data at a location within the composite GUI, such that selection of the graphical icon causes the composite interface module 220 to display the interface elements associated with the selected graphical element.

In further example embodiments, a portion of the composite GUI created by the composite interface module 220 includes a sidebar containing a presentation of the graphical icons associated with each of the referenced applications. For example, the sidebar may include an application icon, such that selection of the application icon results in display of a window which includes an arrangement of the graphical icons. A user may select one or more of the graphical icons from the display window in order to cause display of the corresponding interface elements associated with each referenced application. In some embodiments, the composite interface module 220 communicates the selection of the graphical icon to the artifact module 210, and in response to receiving the selection, the artifact module 210 causes display of an assortment of artifacts referencing data objects associated with the selected graphical icon. The assortment of graphical icons may be presented as a sortable list within the composite GUI.

The notification module 230 provides publish-subscribe type messaging capability, to automatically distribute projects defined by a user within the composite graphical user interface (e.g., by selecting one or more artifacts to include in a project) to a group of subscribers. For example, upon receiving a project definition (i.e., a set of artifacts selected and assigned to the project), the notification module 230 identifies a subscription request from a referenced application. The subscription request may include one or more user identifiers with various network addresses to receive the project (and corresponding artifacts).

The notification module 230 distributes the project to the application. Upon receipt of the project, the application may access the data objects associated the project through the associated artifacts. For example, upon receipt of the projects, the applications may extract the artifacts, and access the data objects associated with the artifacts through the composite interface system 150. In this way, an application itself doesn't have to know how to read a particular data type itself, but can instead rely on the composite interface system 150 to retrieve and access the data based on the artifact.

The permissions module 240 is configured to evaluate and determine user access permissions with respect to data objects referenced by artifacts in the composite interface system 150. The evaluation of user access permissions, in most instances, is triggered by receipt of an access request received via an API from a referenced application supported by the composite interface system 150. The access request includes a data resource identifier corresponding to the data object for which access is being requested, and a user identifier corresponding to the requesting user. In some instances, the access request may further include one or more filters identifying one or more particular operations or sets of operations that are of interest.

Figure 3:
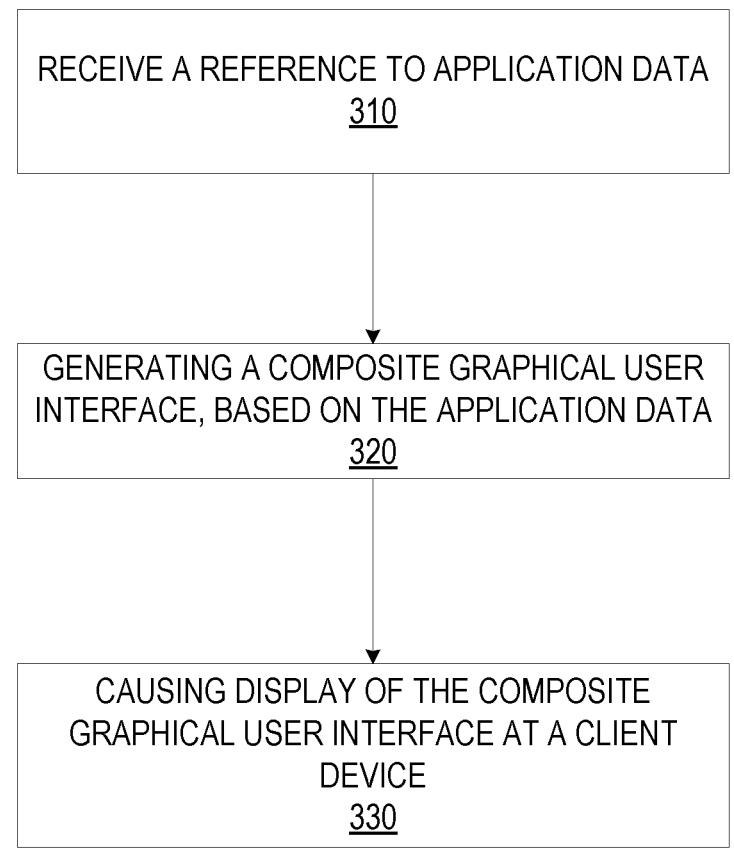
FIG. 3 is a flowchart illustrating a method for generating a composite graphical user interface, according to some example embodiments.

FIG. 3 is a flow-chart illustrating a method 300 for generating and causing display of a composite GUI at a client device, according to some example embodiments. The method 300 is embodied in computer-readable instructions for execution by one or more processors such that the operations of the method 300 are performed in part or in whole by the network-based composite interface system 150; accordingly, the method 300 is described below by way of example with reference thereto. However, it shall be appreciated that at least some of the operations of the method 300 may be deployed on various other hardware configurations, and the method 300 is not intended to be limited to the network-based composite interface system 150.

At operation 310, the composite interface module 220 receives a reference to application data of an application. For example, the composite interface module 220 may provide a set of computer-readable instructions to the client device 110 that causes the client device 110 to display an application reference interface. The user 106 may thereby provide references to application data of applications to be included within the composite GUI generated by the composite interface system 150. In some embodiments, in response to receiving the reference to the application data, the artifact module 210 identifies data objects associated with the referenced application and creates one or more artifacts based on the metadata of the data objects.

At operation 320, the composite interface module 220 receives an instruction to generate a composite GUI, and in response, generates a composite GUI which includes the interface elements of the referenced application. A portion of the composite GUI may include a sidebar in which a graphical icon representing the referenced application data is displayed. In some example embodiments, the sidebar may include an application icon, which a user may select, and in response to receiving a selection of the application icon, the composite interface module 220 may cause display of a window which includes one or more graphical icons associated with referenced applications (e.g., such that selection of the graphical icon results in display of interface elements of a referenced application).

In further example embodiments, the composite GUI includes a presentation of a listing of artifacts associated with the referenced application data. For example, responsive to receiving the reference to the application data, the artifact module 210 creates one or more artifacts based on the referenced application data, and stores the artifacts within an artifact repository (e.g., database 126). Thus, at operation 320, when the composite interface module 220 generates the composite GUI based on the application data, the composite interface module 220 may access the artifact repository to retrieve the set of artifacts associated with the application.

At operation 330, the composite interface module 220 causes display of the composite GUI at a client device (e.g., client device 110). In some embodiments, the permissions module 240 may identify user access permissions associated with a user identifier associated with the client device 110, and cause display of the composite GUI based on the determined user permissions. For example, a user may not have access to an entire set of artifacts based on their user permissions. Upon determining the user permissions of the user identifier, the permissions module 240 removes artifacts which are inaccessible to the user identifier, and presents only those artifacts which the user permissions allow.

Figure 4:
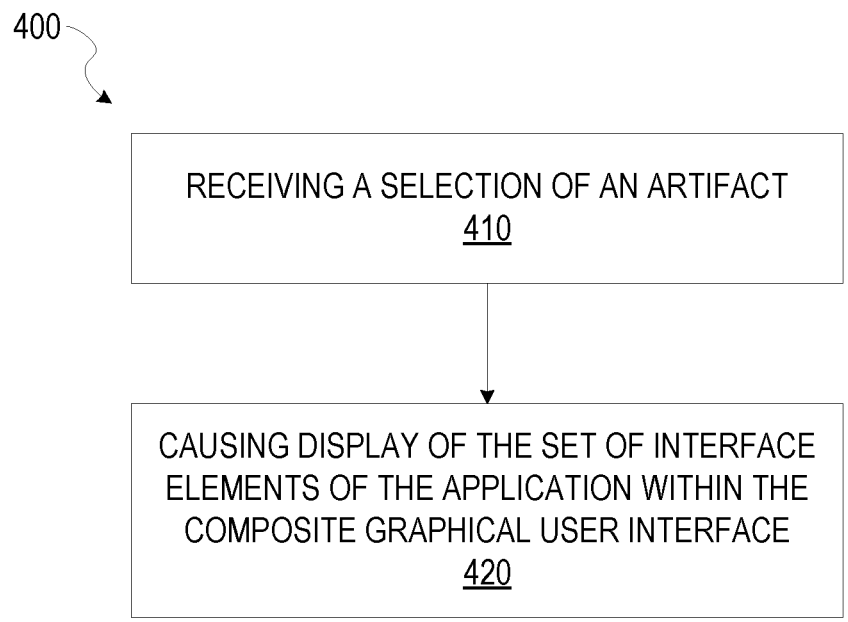
FIG. 4 is a flowchart, illustrating a method for displaying a set of interface elements, consistent with some embodiments.

FIG. 4 is a flow-chart illustrating a method 400 for causing display of a set of interface elements associated with a referenced application based on a selection of an artifact, according to some example embodiments. The method 400 is embodied in computer-readable instructions for execution by one or more processors such that the operations of the method 400 are performed in part or in whole by the network-based composite interface system 150; accordingly, the method 400 is described below by way of example with reference thereto. However, it shall be appreciated that at least some of the operations of the method 400 may be deployed on various other hardware configurations, and the method 400 is not intended to be limited to the network-based composite interface system 150.

At operation 410, the composite interface module 220 receives a selection of an artifact from a client device 110. For example, the composite GUI may include a set of artifacts associated with referenced applications. The set of artifacts may be presented in a user defined sort order (e.g., through a selection of an attribute), based on metadata associated with the artifact.

At operation 420, in response to receiving a selection of the artifact at the client device 110, the composite interface module 220 identifies the referenced application associated with the artifact and causes display of the interface elements of the identified application.

Figure 5:
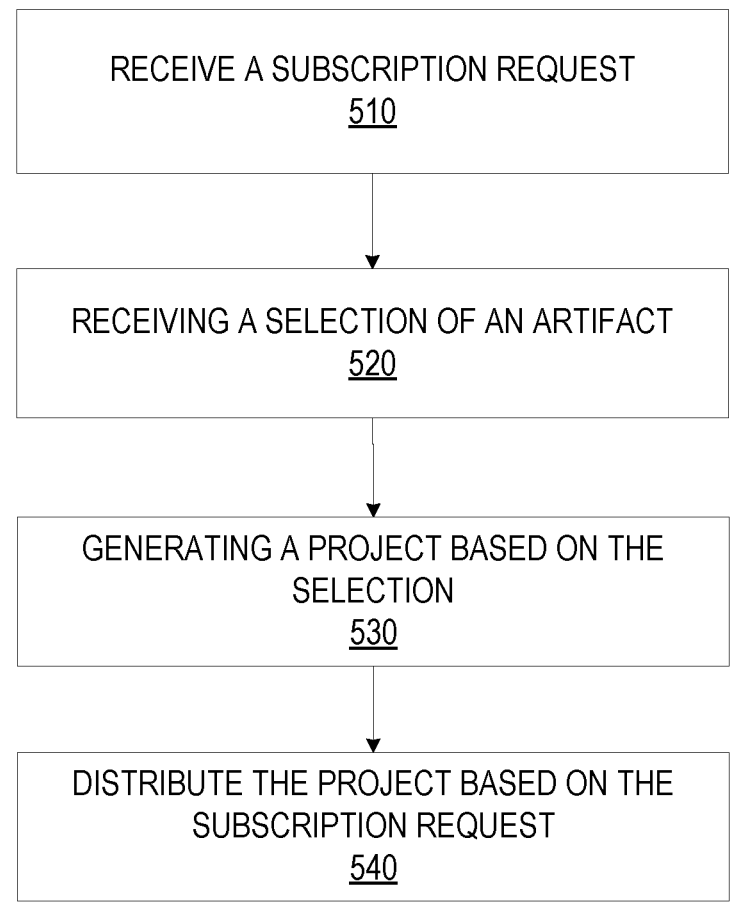
FIG. 5 is a flowchart, illustrating a method of generating and sharing a project, consistent with some embodiments.

FIG. 5 is a flow-chart illustrating a method 500 for distributing a project based on a subscription request, according to some example embodiments. The method 500 is embodied in computer-readable instructions for execution by one or more processors such that the operations of the method 500 are performed in part or in whole by the network-based composite interface system 150; accordingly, the method 500 is described below by way of example with reference thereto. However, it shall be appreciated that at least some of the operations of the method 500 may be deployed on various other hardware configurations, and the method 500 is not intended to be limited to the network-based composite interface system 150.

Many applications or services need long-running calls and a scheme for pushing data to the front-end, and in some cases, backend services may need to communicate with unrelated or incompatible front-ends (e.g. pushing data from one referenced application to another referenced application). The front-end refers to the portion of an application which users interact with, while the back-end refers to the resources of the application configured to service and provide functionality to the front-end. The front-end of one application may not necessarily be compatible with the back-end of another application. The composite GUI generated by the composite interface system 150 therefore provides a general communications channel between the back-end of a referenced application and a front-end of another referenced application, and as such provides a way to address messages to reach the front-end via the use of projects (e.g., sets of artifacts).

At operation 510, the notification module 230 receives a subscription request from a referenced application. The subscription request includes an application identifier of the subscribing application, and a user identifier of a subscribing user. The subscription request may also include a data type.

At operation 520, the artifact module 210 receives a selection of one or more artifacts at the client device 110. For example, a user 106 may select one or more artifacts among a set of artifacts displayed in the composite GUI at the client device 110.

At operation 530, the artifact module 210 receives a request from the client device 110 to assign the selected artifacts to a project. In response to receiving the request to assign the selected artifacts to a project, the artifact module 210 generates a project which includes the selected artifacts.

At operation 540, the notification module 230 distributes the project based on the subscription request, to the referenced application. The referenced application may then notify the subscribing user (e.g., based on the user identifier) of the project. The requesting application may then access then artifacts through the project, and cause display of the data objects associated with the artifacts through the composite GUI.

Figure 6:
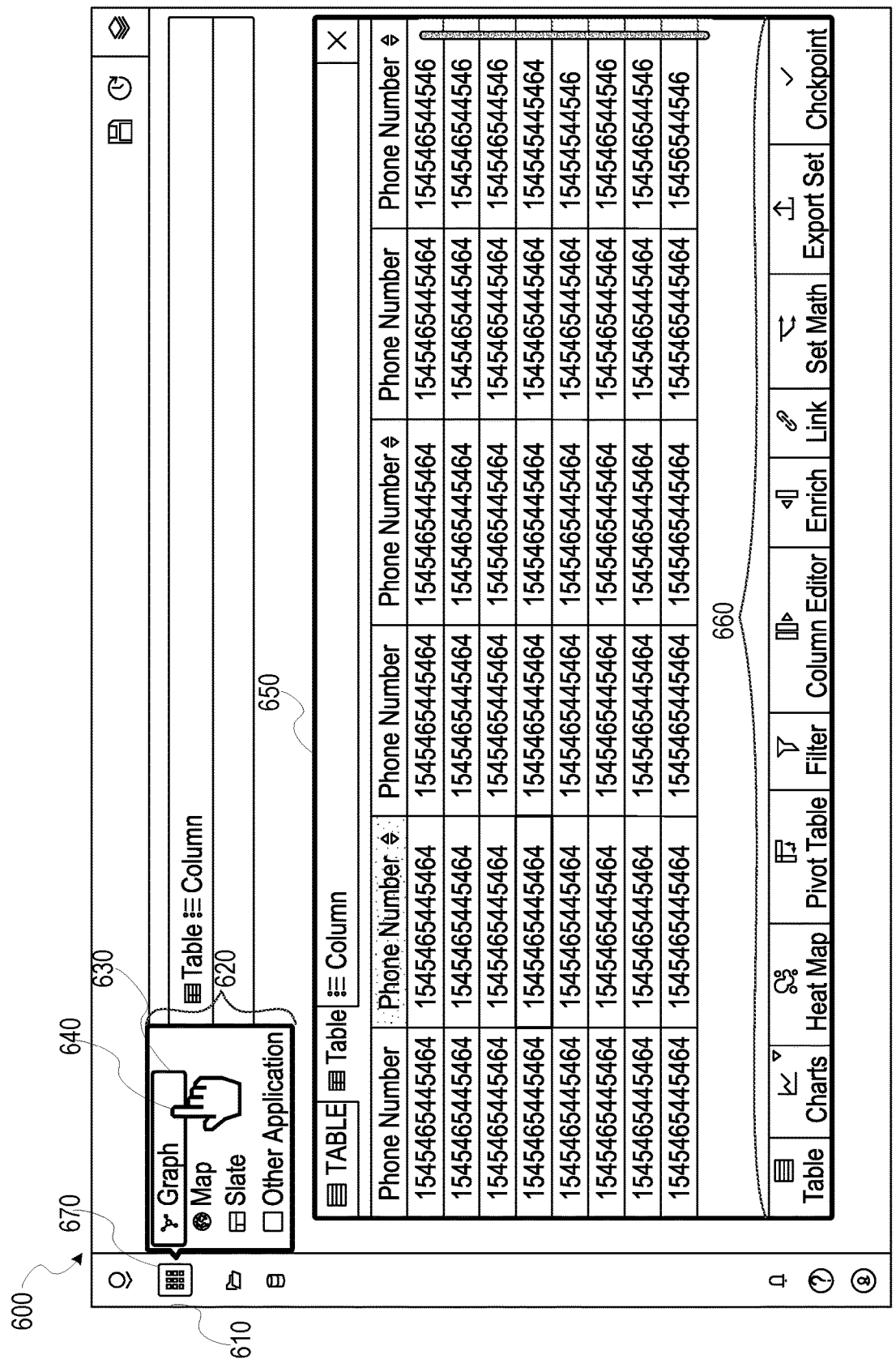
FIG. 6 is an interface diagram illustrating a composite graphical user interface displaying a set of artifacts, consistent with some embodiments.

As an example of the composite GUI generated by the composite interface module 220, FIG. 6 is an interface diagram illustrating a composite GUI 600 for displaying interface elements of a referenced application, according to some example embodiments. As shown, the composite GUI 600 includes a sidebar 610, an application window 620, the application window 620 including a set of graphical icons representing referenced applications (e.g., graphical icon 630), a cursor 640 to make selections within the composite GUI 600, a referenced application interface 650, and a set of interface elements 660, of the referenced application.

For example, in response to receiving the reference to the application data, as in operation 310 of FIG. 3, the composite interface module 220 creates a graphical icon 630 to display within the sidebar 610. As shown in FIG. 6, the sidebar may also include an application icon 670, which a user 106 may select with the cursor 640 to display the application window 620, which includes a set of graphical icons, such as graphical icon 630, representative of referenced applications. Upon receiving a selection of the graphical icon 630, the composite interface module 220 causes display of the associated interface (e.g., interface 650), and its interface elements 660.

As an example of the composite GUI generated by the composite interface module 220, FIG. 7 is an interface diagram illustrating the composite GUI 600 for displaying a set of artifacts to create a sharable project, according to some example embodiments. As shown, the composite GUI 600 is shown to include a set of artifacts 710, a graphical icon identifying an application type 720, a search field 730, a project creation window 740, and the cursor 640.

In some embodiments, the composite GUI 600 displays a set of artifacts associated with the referenced applications (e.g., set of artifacts 710). A user 106 may select an artifact (e.g., artifact 750) with the cursor 640. In response to receiving the selection of the artifact 750, the composite GUI 600 causes display of a project creation window 740. The project creation window 740 includes a set of options to share the artifact in a project or to an individual or group of individuals based on a user identifier or set of user identifiers provided by the user 106, or to duplicate, rename, or convert the artifact into another format or data type. For example, as in operation 520 of FIG. 5, a user 106 may select the artifact 750 to assign the artifact 750 to a project, which may then be distributed to a subscriber or subscriber list.

The composite GUI 600 is also shown to include a search field 730. A user 106 may enter a search term into the search field 730, and in response to receiving the search term, the artifact module 210 may present relevant artifacts within the composite GUI 600.

Figure 8:
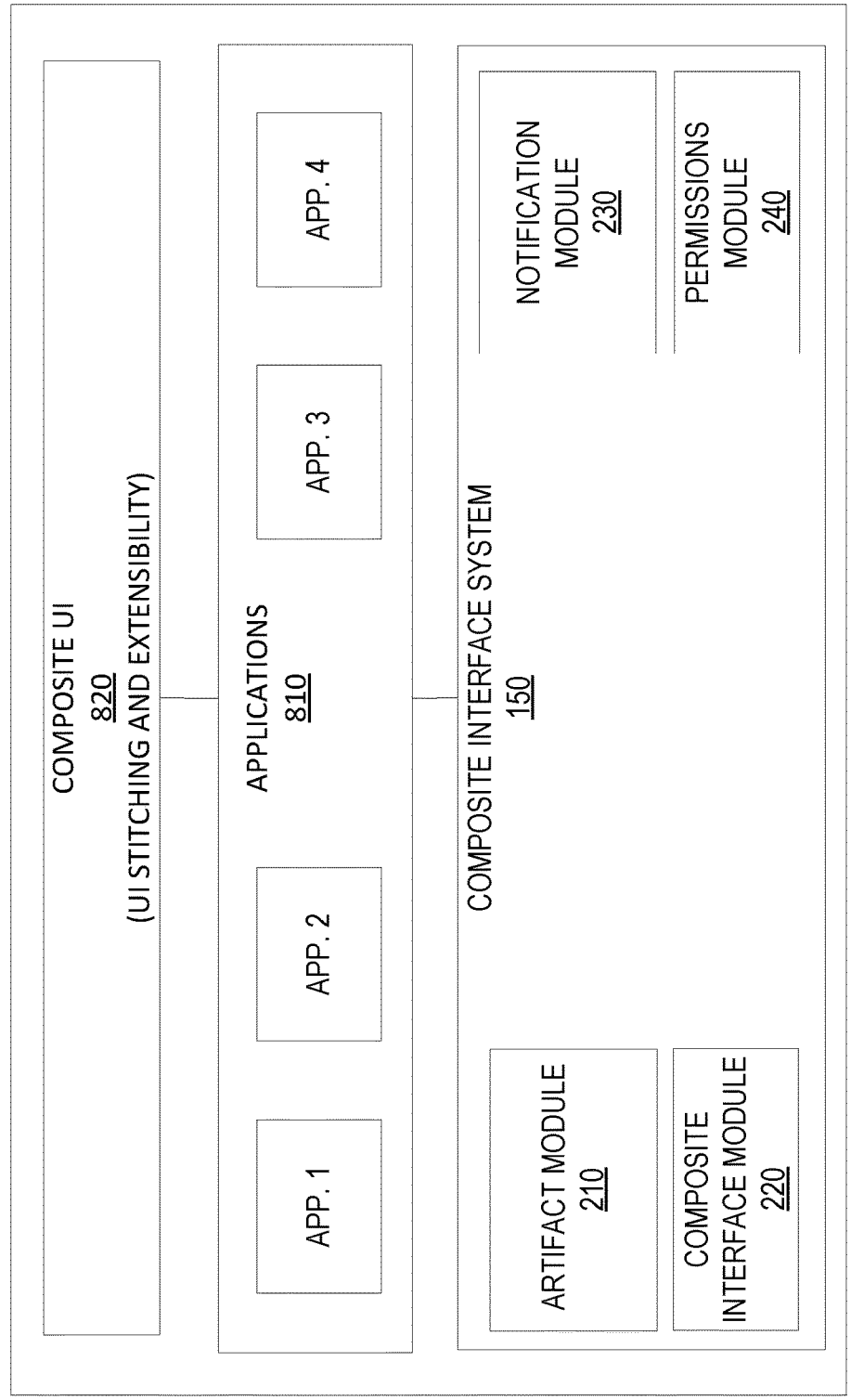
FIG. 8 is an illustration of the various components of a composite user interface, consistent with some embodiments.

FIG. 8 is an illustration of the composite interface system 150, a set of applications 810, and a composite user interface 820, generated by the composite interface system 150, based on the applications 810. The applications 810 may be located at both local (e.g., databases 126) and third-party servers, as well as cloud servers. The composite interface system 150 receives references to the applications 810 (e.g., App. 1, App. 2, App. 3, App. 4), and generate the composite user interface 820, based on interface elements from the set of applications 810.

Figure 9:
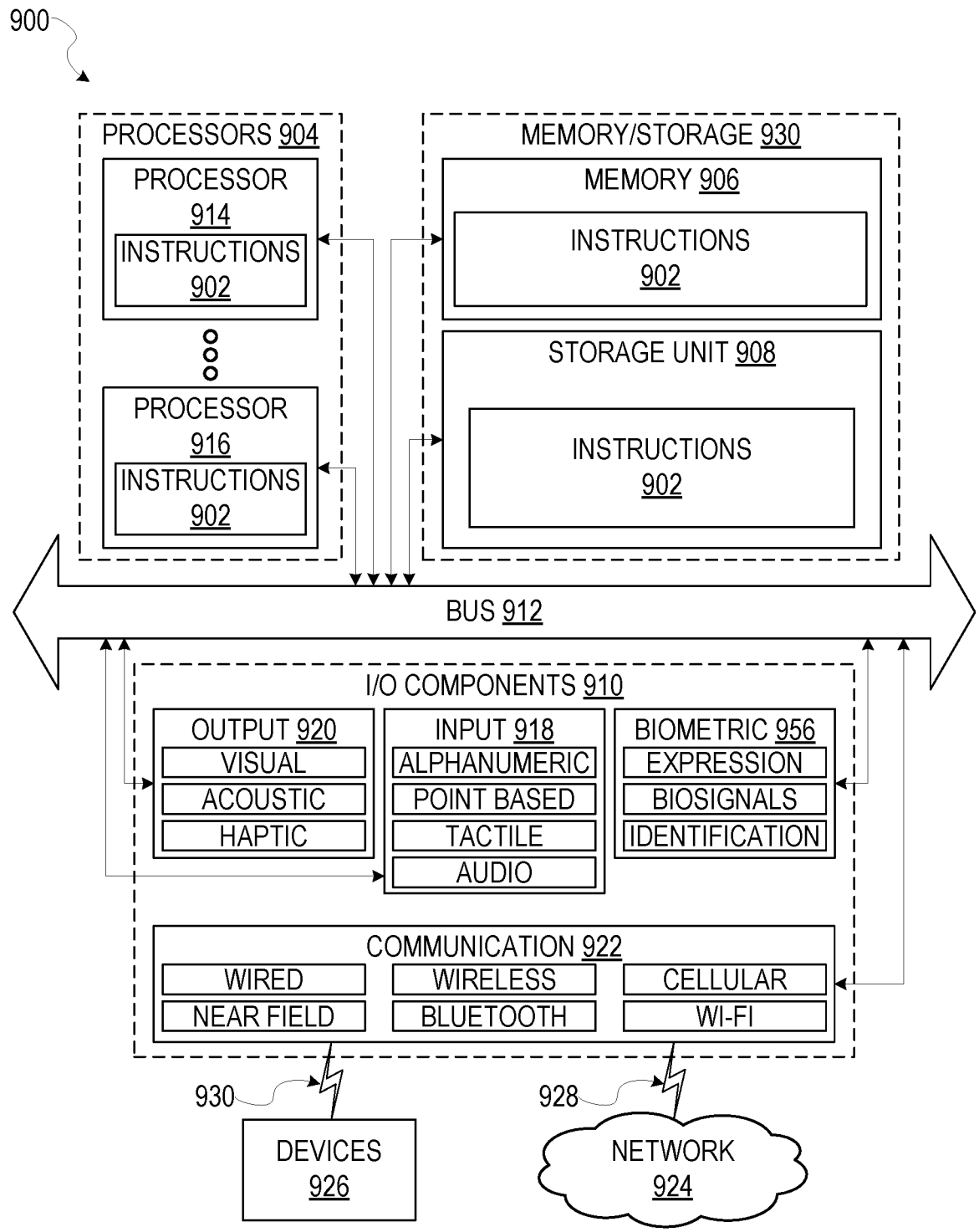
FIG. 9 is a diagrammatic representation of a machine in the example form of a computer system within which a set of instructions for causing the machine to perform any one or more of the methodologies discussed herein may be executed.

FIG. 9 is a diagrammatic representation of a machine in the example form of a computer system within which a set of instructions for causing the machine to perform any one or more of the methodologies discussed herein may be executed. Specifically, FIG. 9 shows a diagrammatic representation of the machine 900 in the example form of a system, within which instructions 902 (e.g., software, a program, an application, an applet, an app, a driver, or other executable code) for causing the machine 900 to perform any one or more of the methodologies discussed herein may be executed. For example, the instructions 902 include executable code that causes the machine 900 to execute the methods 400 and 500. In this way, these instructions 902 transform the general, non-programmed machine into a particular machine programmed to carry out the described and illustrated functions in the manner described herein. The machine 900 may operate as a standalone device or may be coupled (e.g., networked) to other machines.

By way of non-limiting example, the machine 900 may comprise or correspond to a television, a computer (e.g., a server computer, a client computer, a personal computer (PC), a tablet computer, a laptop computer, or a netbook), a set-top box (STB), a personal digital assistant (PDA), an entertainment media system (e.g., an audio/video receiver), a cellular telephone, a smart phone, a mobile device, a wearable device (e.g., a smart watch), a portable media player, or any machine capable of outputting audio signals and capable of executing the instructions 902, sequentially or otherwise, that specify actions to be taken by machine 900. Further, while only a single machine 900 is illustrated, the term "machine" shall also be taken to include a collection of machines 900 that individually or jointly execute the instructions 902 to perform any one or more of the methodologies discussed herein.

The machine 900 may include processors 904, memory 906, storage unit 908 and I/O components 910, which may be configured to communicate with each other such as via a bus 912. In an example embodiment, the processors 904 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) may include, for example, processor 914 and processor 916 that may execute instructions 902. The term "processor" is intended to include multi-core processors that may comprise two or more independent processors (sometimes referred to as "cores") that may execute instructions contemporaneously. Although FIG. 9 shows multiple processors, the machine 900 may include a single processor with a single core, a single processor with multiple cores (e.g., a multi-core processor), multiple processors with a single core, multiple processors with multiples cores, or any combination thereof.

The memory 906 (e.g., a main memory or other memory storage) and the storage unit 908 are both accessible to the processors 904 such as via the bus 912. The memory 906 and the storage unit 908 store the instructions 902 embodying any one or more of the methodologies or functions described herein. In some embodiments, the databases 126 resides on the storage unit 908. The instructions 902 may also reside, completely or partially, within the memory 906, within the storage unit 908, within at least one of the processors 904 (e.g., within the processor's cache memory), or any suitable combination thereof, during execution thereof by the machine 900. Accordingly, the memory 906, the storage unit 908, and the memory of processors 904 are examples of machine-readable media.

As used herein, "machine-readable medium" means a device able to store instructions and data temporarily or permanently and may include, but is not be limited to, random-access memory (RAM), read-only memory (ROM), buffer memory, flash memory, optical media, magnetic media, cache memory, other types of storage (e.g., erasable programmable read-only memory (EEPROM)), or any suitable combination thereof. The term "machine-readable medium" should be taken to include a single medium or multiple media (e.g., a centralized or distributed database, or associated caches and servers) able to store instructions 902. The term "machine-readable medium" shall also be taken to include any medium, or combination of multiple media, that is capable of storing instructions (e.g., instructions 902) for execution by a machine (e.g., machine 900), such that the instructions, when executed by one or more processors of the machine 900 (e.g., processors 904), cause the machine 900 to perform any one or more of the methodologies described herein (e.g., methods 400 and 500). Accordingly, a "machine-readable medium" refers to a single storage apparatus or device, as well as "cloud-based" storage systems or storage networks that include multiple storage apparatus or devices. The term "machine-readable medium" excludes signals per se.

Furthermore, the "machine-readable medium" is non-transitory in that it does not embody a propagating signal. However, labeling the tangible machine-readable medium as "non-transitory" should not be construed to mean that the medium is incapable of movement—the medium should be considered as being transportable from one real-world location to another. Additionally, since the machine-readable medium is tangible, the medium may be considered to be a machine-readable device.

The I/O components 910 may include a wide variety of components to receive input, provide output, produce output, transmit information, exchange information, capture measurements, and so on. The specific I/O components 910 that are included in a particular machine will depend on the type of machine. For example, portable machines such as mobile phones will likely include a touch input device or other such input mechanisms, while a headless server machine will likely not include such a touch input device. It will be appreciated that the I/O components 910 may include many other components that are not specifically shown in FIG. 9. The I/O components 910 are grouped according to functionality merely for simplifying the following discussion and the grouping is in no way limiting. In various example embodiments, the I/O components 910 may include input components 918 and output components 920. The input components 918 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components, and the like. The output components 920 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth.

Communication may be implemented using a wide variety of technologies. The I/O components 910 may include communication components 922 operable to couple the machine 900 to a network 924 or devices 926 via coupling 928 and coupling 930, respectively. For example, the communication components 922 may include a network interface component or other suitable device to interface with the network 924. In further examples, communication components 922 may include wired communication components, wireless communication components, cellular communication components, near field communication (NFC) components, Bluetooth® components (e.g., Bluetooth® Low Energy), WiFi® components, and other communication components to provide communication via other modalities. The devices 926 may be another machine or any of a wide variety of peripheral devices (e.g., a peripheral device coupled via a Universal Serial Bus (USB)).

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field-programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses that connect the hardware modules). In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., APIs).

Electronic Apparatus and System

Example embodiments may be implemented in digital electronic circuitry, or in computer hardware, firmware, or software, or in combinations of them. Example embodiments may be implemented using a computer program product, for example, a computer program tangibly embodied in an information carrier, for example, in a machine-readable medium for execution by, or to control the operation of, data processing apparatus, for example, a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site, or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., an FPGA or an ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out hardware (e.g., machine) and software architectures that may be deployed, in various example embodiments.

Language

Although the embodiments of the present invention have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

All publications, patents, and patent documents referred to in this document are incorporated by reference herein in their entirety, as though individually incorporated by reference. In the event of inconsistent usages between this document and those documents so incorporated by reference, the usage in the incorporated references should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim are still deemed to fall within the scope of that claim.

What is claimed is:

1. A system comprising: one or more processors of a machine; and
    a memory storing instructions that, when executed by at least one processor among the processors, causes the system to perform operations comprising:
    receiving a reference to application data of an application;
    identifying a data object associated with the application;
    in response to receiving the reference to the application data of the application, generating a composite graphical user interface (GUI);
    causing display of the composite GUI at a client device;
    receiving a selection of an interface element representative of an application, the application comprising a data object, wherein the data object comprises data attributes;
    determining a data type of the data object based on the data attributes;
    selecting a compatible application from among a plurality of applications based on at least the data type of the data object, the compatible application comprising application data; and
    causing display of interface elements of the compatible application within the composite GUI,
    wherein the composite GUI comprises a set of artifacts associated with the application data and in response to receiving selection of an artifact from the set of artifacts the composite GUI causes display of a project creation window having a set of options.

2. The system of claim 1, wherein the selecting the compatible application from among the plurality of applications further comprises:
    accessing a server that hosts application data corresponding to the compatible application, the application data identifying the set of interface elements of the compatible application.

3. The system of claim 1, wherein the application data defines a set of interface elements, and the generating the application interface includes generating the application interface based on the set of interface elements.

4. The system of claim 1, wherein the accessing receiving a selection of the data object at the client device includes:
    receiving a search request that identifies the data object; and accessing the data object responsive to the search request.

5. The system of claim 4, wherein the search request further comprises user permissions, and the operations further comprise:
    causing display of a plurality of data objects based on the search request and the user permissions; and
    receiving a selection of the data object from among the plurality of data objects.

6. The system of claim 1, wherein the accessing the data object at the client device includes:
    causing display of a presentation of a plurality of data objects that include the data object at the client device; and
    receiving a selection of the data object from among the presentation of the plurality of data objects.

7. The system of claim 6, wherein the presentation of the plurality of data objects includes a display of an identification of an application that corresponds with each of the plurality of data objects.

8. A non-transitory machine-readable storage medium comprising instructions that, when executed by one or more processors of a machine, cause the machine to perform operations comprising:
    receiving a reference to application data of an application;
    identifying a data object associated with the application;
    in response to receiving the reference to the application data of the application, generating a composite graphical user interface (GUI);
    causing display of the composite GUI at a client device;
    receiving a selection of an interface element representative of an application, the application comprising a data object, wherein the data object comprises data attributes;
    determining a data type of the data object based on the data attributes;
    selecting a compatible application from among a plurality of applications based on at least the data type of the data object, the compatible application comprising application data; and
    causing display of interface elements of the compatible application within the composite GUI,
    wherein the composite GUI comprises a set of artifacts associated with the application data and in response to receiving selection of an artifact from the set of artifacts the composite GUI causes display of a project creation window having a set of options.

9. The non-transitory machine-readable storage medium of claim 8, wherein the selecting the compatible application from among the plurality of applications further comprises:

accessing a server that hosts application data corresponding to the compatible application, the application data identifying the set of interface elements of the compatible application.

10. The non-transitory machine-readable storage medium of claim 8, wherein the application data defines a set of interface elements, and the generating the application interface includes generating the application interface based on the set of interface elements.

11. The non-transitory machine-readable storage medium of claim 8, wherein the accessing the receiving the selection of the data object at the client device includes:

receiving a search request that identifies the data object; and accessing the data object responsive to the search request.

12. The non-transitory machine-readable storage medium of claim 11, wherein the search request further comprises user permissions, and the operations further comprise:

causing display of a plurality of data objects based on the search request and the user permissions; and receiving a selection of the data object from among the plurality of data objects.

13. The non-transitory machine-readable storage medium of claim 8, wherein the accessing the data object at the client device includes:

causing display of a presentation of a plurality of data objects that include the data object at the client device; and receiving a selection of the data object from among the presentation of the plurality of data objects.

14. The system of claim 13, wherein the presentation of the plurality of data objects includes a display of an identification of an application that corresponds with each of the plurality of data objects.

15. A method comprising:

receiving a reference to application data of an application;

identifying a data object associated with the application;

in response to receiving the reference to the application data of the application, generating a composite graphical user interface (GUI);

causing display of the composite GUI at a client device;

receiving a selection of an interface element representative of an application, the application comprising a data object, wherein the data object comprises data attributes;

determining a data type of the data object based on the data attributes;

selecting a compatible application from among a plurality of applications based on at least the data type of the data object, the compatible application comprising application data; and causing display of interface elements of the compatible application within the composite GUI, wherein the composite GUI comprises a set of artifacts associated with the application data and in response to receiving selection of an artifact from the set of artifacts the composite GUI causes display of a project creation window having a set of options.

16. The method of claim 15, wherein the selecting the compatible application from among the plurality of applications further comprises:

accessing a server that hosts application data corresponding to the compatible application, the application data identifying the set of interface elements of the compatible application.

17. The method of claim 15, wherein the application data defines a set of interface elements, and the generating the application interface includes generating the application interface based on the set of interface elements.

18. The method of claim 15, wherein the accessing receiving the selection of the data object at the client device includes:

receiving a search request that identifies the data object; and accessing the data object responsive to the search request.

19. The method of claim 18, wherein the search request further comprises user permissions, and the method further comprises:

causing display of a plurality of data objects based on the search request and the user permissions; and receiving a selection of the data object from among the plurality of data objects.

20. The method of claim 15, wherein the accessing the data object at the client device includes:

causing display of a presentation of a plurality of data objects that include the data object at the client device; and receiving a selection of the data object from among the presentation of the plurality of data objects.

* * * * *